United States Patent
Galvan et al.

(10) Patent No.: US 8,569,418 B2
(45) Date of Patent: *Oct. 29, 2013

(54) POLYOLEFIN COMPOSITIONS

(75) Inventors: Monica Galvan, S. Maria Maddalena (IT); Marco Ciarafoni, Ferrara (IT); Roberto Pantaleoni, Ferrara (IT); Angelo Ferraro, Bologna (IT)

(73) Assignee: Basell Poliolefine Italia S.R.L., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 13/378,952

(22) PCT Filed: Jun. 23, 2010

(86) PCT No.: PCT/EP2010/058916
§ 371 (c)(1),
(2), (4) Date: Feb. 15, 2012

(87) PCT Pub. No.: WO2010/149705
PCT Pub. Date: Dec. 29, 2010

(65) Prior Publication Data
US 2012/0136121 A1 May 31, 2012

Related U.S. Application Data

(60) Provisional application No. 61/269,634, filed on Jun. 26, 2009.

(30) Foreign Application Priority Data

Jun. 26, 2009 (EP) .................... 09163842

(51) Int. Cl.
*C08L 23/04* (2006.01)
*C08L 23/10* (2006.01)
*C08F 8/00* (2006.01)

(52) U.S. Cl.
USPC .......................... 525/191; 525/240

(58) Field of Classification Search
USPC ................ 525/191, 240
See application file for complete search history.

(56) References Cited

U.S. PATENT DOCUMENTS

| 4,298,718 A | 11/1981 | Mayr et al. |
| 4,399,054 A | 8/1983 | Ferraris |
| 4,469,648 A | 9/1984 | Ferraris |
| 4,472,524 A | 9/1984 | Albizzati |
| 4,495,338 A | 1/1985 | Mayr et al. |
| 2012/0035327 A1* | 2/2012 | Ciarafoni et al. ............. 525/240 |

FOREIGN PATENT DOCUMENTS

| EP | 45977 | 2/1982 |
| EP | 0170255 | 2/1986 |
| EP | 0373660 | 6/1990 |
| EP | 0603723 | 6/1994 |
| EP | 0361493 | 11/1994 |
| EP | 728769 | 8/1996 |
| EP | 1176169 | 1/2002 |
| EP | 1135440 | 8/2004 |
| WO | WO-0119915 | 3/2001 |
| WO | WO-0158970 | 8/2001 |
| WO | WO-2008061843 | 5/2008 |

* cited by examiner

*Primary Examiner* — Nathan M Nutter

(57) ABSTRACT

Polyolefin compositions particularly suitable for cast film, exhibiting heat sealability, retortability, low haze and stiffness, comprising:

1) 75-85% of a propylene homopolymer or copolymer of propylene with ethylene and/or one or more $C_4$-$C_{10}$ α-olefin(s), the homopolymer or copolymer having melting temperature equal to or higher than 150° C., 2) 15-25% of a copolymer of ethylene with one or more $C_4$-$C_{10}$ α-olefin(s) containing from 20 to 30% of said $C_4$-$C_{10}$ α-olefin(s);

said composition having MFR (at 230° C., 2.16 kg) of from 5-10 g/10 min, the total content of ethylene of from 10 to 20%, the total content of $C_4$-$C_{10}$ α-olefin(s) of from 2 to 8%, the ratio XStot/XSm of the total fraction soluble in Xylene at room temperature to the fraction soluble in Xylene at room temperature of the matrix component (1) of from 5 to 15, and the value of the intrinsic viscosity of the total fraction soluble in Xylene at room temperature (XSIVtot) of 1.5 dl/g or less.

7 Claims, No Drawings

POLYOLEFIN COMPOSITIONS

This application is the U.S. national phase of International Application PCT/EP2010/058916, filed Jun. 23, 2010, claiming priority to European Application 09163842.9 filed Jun. 26, 2009 and the benefit under 35 U.S.C. 119(e) of U.S. Provisional Application No. 61/269,634, filed Jun. 26, 2009; the disclosures of International Application PCT/EP2010/058916, European Application 09163842.9 and U.S. Provisional Application No. 61/269,634, each as filed, are incorporated herein by reference.

The present invention concerns polyolefin compositions comprising a propylene polymer component selected from propylene homopolymers and propylene random copolymers containing ethylene and/or other α-olefins as comonomers, and a copolymer of ethylene with $C_4$-$C_{10}$ α-olefins.

The compositions of the present invention can be easily converted into various kinds of finished or semi-finished articles. In particular, the compositions of the present invention are suitable for film applications, particularly for cast films, exhibiting heat seal-ability, retortability and good optical properties (low haze on film) together with high flexural modulus (stiffness). The compositions can be used in particular for those film applications requiring good optical properties and stiffness such as packaging for fresh vegetables, laminated retortable and flexible packaging and clear retortable pouches. The compositions are also suitable for injection moulding applications such as batteries and caps and closures. Compositions comprising crystalline polypropylene matrix and a rubbery phase formed by an elastomeric copolymer of ethylene with α-olefins are already known in the art, and described in particular in European patents 170 255, 373 660, 603723, and 1135440 and in the International Application WO 2008/061843.

Said compositions exhibit impact resistance and, in the case of European patent 373 660, 603723, 1135440, transparency values interesting for many applications. However the overall balance of properties is still not totally satisfactory in the whole range of possible applications, in view of the high standards required by the market.

Therefore, there still remains a continuous demand for compositions of this kind with improved properties balanced for specific target applications.

An excellent balance of properties particularly in view of application for films and retortable packaging has now been achieved by the polyolefin compositions of the present invention comprising, in percent by weight referred to the sum of component 1) and 2):

1) 75-85% of a propylene homopolymer or copolymer of propylene with ethylene and/or one or more $C_4$-$C_{10}$ α-olefin(s), the said homopolymer or copolymer having melting temperature (Tm-DSC) equal to or higher than 150° C. preferably higher than 154° C.

2) 15-25% of a copolymer of ethylene with one or more $C_4$-$C_{10}$ α-olefin(s) containing from 20 to 30 wt %, preferably from 22 to 28 wt % of said $C_4$-$C_{10}$ α-olefin(s);

said composition having the value of melt flow rate (MFR) at 230° C., 2.16 kg of from 5 to 10, preferably of from 6 to 8 g/10 min.

the total content of ethylene of from 10 to 20, preferably from 12 to 18 wt %, the total content of $C_4$-$C_{10}$ α-olefin(s) of from 2 to 8, preferably from 3 to 7 wt %, more preferably of from 5 to 7 the ratio (XStot/XSm) of the total fraction soluble in Xylene at room temperature to the fraction soluble in Xylene at room temperature of the component (1) (matrix) of from 5 to 15, preferably of from 8 to 12, and the value of the intrinsic viscosity of the total fraction soluble in Xylene at room temperature (XSIVtot) is of 1.5 dl/g or less, preferably of 1.3 or less, more preferably of from 1.1 to 1.3 dl/g;

Particularly preferred features for the compositions of the present invention are:

the fraction soluble in Xylene at room temperature of component (1) (XSm) equal to or less than 2 wt %.

when the matrix component (1) is a copolymer of propylene, the amount of units derived from ethylene and/or one or more $C_4$-$C_{10}$ α-olefin(s) is less than 1.5 wt %, preferably less than 1 wt % of the component (1), more preferably less than 0.5 wt % (minirandom copolymer).

the MFR (at 230° C., 2.16 Kg) of component (1) is from 5 to 10 g/10 min, preferably of from 6 to 8 g/10 min.

the total fraction soluble in Xylene at room temperature (XStot) of less than 20 wt % or less, preferably of 18 wt % or less, more preferably of from 10 to 18 wt % the flexural modulus of more than 900 MPa, more preferably more than 1000 MPa;

the ratio of the total content of ethylene to the total content of $C_4$-$C_{10}$ α-olefin(s) of 2.3 or more.

Throughout the present Specification the term "copolymer" is meant to include also polymers containing, in addition to the main monomer, more than one kind of further comonomers. XStot is the total fraction soluble in Xylene at room temperature in percent by weight with respect to the sum of the matrix component (1) and the rubber component (2). XSm is the fraction soluble in Xylene at room temperature of component (1) in percent by weight referred to the component (1). Tm-DSC is the melting temperature of the matrix component (1) as measured on the composition, according to the method reported below, before the addition of nucleating agents that can raise the melting temperature. Thus, the final melting temperature measured on the composition after the addition of a nucleating agent can be higher (e.g. 3 to 5° C. higher). Nucleating agents can be required for some specific end-use (e.g. injection moulding application).

The compositions of the present invention provide in particular a combination of high flexural modulus, good film quality (low fish eyes number) and excellent transparency on films (low haze).

The said $C_4$-$C_{10}$ α-olefins, which are or may be present as comonomers in the components and fractions of the compositions of the present invention, are represented by the formula $CH_2$=CHR, wherein R is an alkyl radical, linear or branched, with 2-8 carbon atoms or an aryl (in particular phenyl) radical.

Examples of said $C_4$-$C_{10}$ α-olefins are 1-butene, 1-pentene, 1-hexene, 4-methyl-1-pentene and 1-octene. Particularly preferred is 1-butene in the rubber component (2) and ethylene in the matrix component (1).

The compositions of the present invention can be prepared by a sequential polymerization, comprising at least two sequential steps, wherein components 1) and 2) are prepared in separate subsequent steps, operating in each step, except the first step, in the presence of the polymer formed and the catalyst used in the preceding step. The catalyst is added preferably only in the first step; however its activity is such that it is still active for all the subsequent steps.

Preferably component 1) is prepared before component 2).

Therefore, the present invention is further directed to a process for the preparation of the polyolefin compositions as reported above, said process comprising at least two sequential polymerization stages with each subsequent polymerization being conducted in the presence of the polymeric material formed in the immediately preceding polymerization reaction, wherein the polymerization stage of propylene to the polymer component 1) is carried out in at least one stage, then at least one copolymerization stage of mixtures of ethylene with one or more $C_4$-$C_{10}$ α-olefin(s) to the elastomeric polymer component 2) is carried out. The polymerisation stages may be carried out in the presence of a stereospecific Ziegler-Natta catalyst.

According to a preferred embodiment, all the polymerisation stages are carried out in the presence of a catalyst comprising a trialkylaluminium compound, optionally an electron donor, and a solid catalyst component comprising a halide or halogen-alcoholate of Ti and an electron-donor compound supported on anhydrous magnesium chloride. Catalysts having the above-mentioned characteristics are well known in the patent literature; particularly advantageous are the catalysts described in U.S. Pat. No. 4,399,054 and EP-A-45 977. Other examples can be found in U.S. Pat. No. 4,472,524.

Preferably the polymerisation catalyst is a Ziegler-Natta catalyst comprising a solid catalyst component comprising:

a) Mg, Ti and halogen and an electron donor (internal donor), b) an alkylaluminum compound and, optionally (but preferably), c) one or more electron-donor compounds (external donor).

The internal donor is preferably selected from the esters of mono or dicarboxylic organic acids such as benzoates, malonates, phthalates and certain succinates. They are described in U.S. Pat. No. 4,522,930, European patent 45977 and international patent applications WO 00/63261 and WO 01/57099, for example. Particularly suited are the phthalic acid esters and succinate acids esters. Alkylphthalates are preferred, such as diisobutyl, dioctyl and diphenyl phthalate and benzyl-butyl phthalate.

Among succinates, they are preferably selected from succinates of formula (I) below:

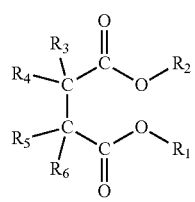

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen, $R_6$ is a radical selected from primary branched, secondary or tertiary alkyl groups, cycloalkyl, aryl, arylalkyl or alkylaryl groups having from 3 to 20 carbon atoms;

or of formula (II) below:

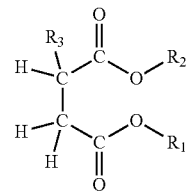

wherein the radicals $R_1$ and $R_2$, equal to or different from each other, are a $C_1$-$C_{20}$ linear or branched alkyl, alkenyl, cycloalkyl, aryl, arylalkyl or alkylaryl group, optionally containing heteroatoms and the radical $R_3$ is a linear alkyl group having at least four carbon atoms optionally containing heteroatoms.

The Al-alkyl compounds used as co-catalysts comprise Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The external donor (c) can be of the same type or it can be different from the succinates of formula (I) or (II). Suitable external electron-donor compounds include silicon compounds, ethers, esters such as phthalates, benzoates, succinates also having a different structure from those of formula (I) or (II), amines, heterocyclic compounds and particularly 2,2,6,6-tetramethylpiperidine, ketones and the 1,3-diethers of the general formula (III):

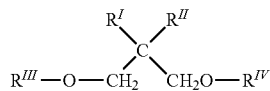

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Preferred electron-donor compounds that can be used as external donors include aromatic silicon compounds containing at least one Si—OR bond, where R is a hydrocarbon radical. A particularly preferred class of external donor compounds is that of silicon compounds of formula $R_a^7 R_b^8 Si(OR^9)_c$, where a and b are integer from 0 to 2, c is an integer from 1 to 3 and the sum (a+b+c) is 4; $R^7$, $R^8$, and $R^9$, are C1-C18 hydrocarbon groups optionally containing heteroatoms. Particularly preferred are the silicon compounds in which a is 1, b is 1, c is 2, at least one of $R^7$ and $R^8$ is selected from branched alkyl, alkenyl, alkylene, cycloalkyl or aryl groups with 3-10 carbon atoms optionally containing heteroatoms and $R^9$ is a $C_1$-$C_{10}$ alkyl group, in particular methyl. Examples of such preferred silicon compounds are cyclohexyltrimethoxysilane, t-butyltrimethoxysilane, t-hexyltrimethoxysilane, cyclohexylmethyldimethoxysilane, 3,3,3-trifluoropropyl-2-ethylpiperidyl-dimethoxysilane, diphenyldimethoxysilane, methyl-t-butyldimethoxysilane, dicyclopentyldimethoxysilane, 2-ethylpiperidinyl-2-t-butyldimethoxysilane, (1,1,1-trifluoro-2-propyl)-methyldimethoxysilane and (1,1,1-trifluoro-2-propyl)-2-ethylpiperidinyldimethoxysilane. Moreover, are also preferred the silicon compounds in which a is 0, c is 3, $R^8$ is a branched alkyl or cycloalkyl group, optionally containing heteroatoms, and $R^9$ is methyl. Particularly preferred specific examples of silicon compounds are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$SKOCH$_3$)$_2$.

Preferably the electron donor compound (c) is used in such an amount to give a molar ratio between the organoaluminum compound and said electron donor compound (c) of from 0.1 to 500, more preferably from 1 to 300 and in particular from 3 to 30.

As explained above, the solid catalyst component comprises, in addition to the above electron donors, Ti, Mg and halogen. In particular, the catalyst component comprises a titanium compound, having at least a Ti-halogen bond and the above mentioned electron donor compounds supported on a Mg halide. The magnesium halide is preferably MgCl$_2$ in active form, which is widely known from the patent literature as a support for Ziegler-Natta catalysts. U.S. Pat. No. 4,298,718 and U.S. Pat. No. 4,495,338 were the first to describe the use of these compounds in Ziegler-Natta catalysis. It is known from these patents that the magnesium dihalides in active form used as support or co-support in components of catalysts for the polymerisation of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds are TiCl$_4$ and TiCl$_3$; furthermore, also Ti-haloalcoholates of formula Ti(OR)n-yXy can be used, where n is the valence of titanium, y is a number between 1 and n, X is halogen and R is a hydrocarbon radical having from 1 to 10 carbon atoms.

The preparation of the solid catalyst component can be carried out according to several methods, well known and described in the art.

According to a preferred method, the solid catalyst component can be prepared by reacting a titanium compound of formula Ti(OR)n-yXy, where n is the valence of titanium and y is a number between 1 and n, preferably TiCl$_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles.

Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermally controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The electron donor compound(s) can be added during the treatment with TiCl$_4$.

Regardless of the preparation method used, the final amount of the electron donor compound(s) is preferably such that the molar ratio with respect to the MgCl$_2$ is from 0.01 to 1, more preferably from 0.05 to 0.5.

The catalysts may be precontacted with small quantities of olefin (prepolymerisation), maintaining the catalyst in suspension in a hydrocarbon solvent, and polymerising at temperatures from ambient to 60° C., thus producing a quantity of polymer from 0.5 to 3 times the weight of the catalyst. The operation can also take place in liquid monomer, producing, in this case, a quantity of polymer 1000 times the weight of the catalyst.

By using the above mentioned catalysts, the polyolefin compositions are obtained in spheroidal particle form, the particles having an average diameter from about 250 to 7,000 μm, a flowability of less than 30 seconds and a bulk density (compacted) greater than 0.4 g/ml.

The polymerisation stages may occur in liquid phase, in gas phase or liquid-gas phase. Preferably, the polymerisation of the polymer component 1) is carried out in liquid monomer (e.g. using liquid propylene as diluent), while the copolymerisation stages of the elastomeric copolymer component 2) is carried out in gas phase. Alternatively, all the sequential polymerisation stages can be carried out in gas phase.

The reaction temperature in the polymerisation stage for the preparation of the polymer component 1) and in the preparation of the elastomeric copolymer component 2) may be the same or different, and is preferably from 40 to 100° C.; more preferably, the reaction temperature ranges from 50 to 80° C. in the preparation of polymer component 1), and from 70 to 100° C. for the preparation of polymer component 2).

The pressure of the polymerisation stage to prepare polymer component 1), if carried out in liquid monomer, is the one which competes with the vapor pressure of the liquid propylene at the operating temperature used, and it may be modified by the vapor pressure of the small quantity of inert diluent used to feed the catalyst mixture, by the overpressure of optional monomers and by the hydrogen used as molecular weight regulator.

The polymerisation pressure preferably ranges from 33 to 43 bar, if done in liquid phase, and from 5 to 30 bar if done in gas phase. The residence times relative to the stages depend on the desired ratio between polymer components 1) and 2), and can usually range from 15 minutes to 8 hours. Conventional molecular weight regulators known in the art, such as chain transfer agents (e.g. hydrogen or ZnEt$_2$), may be used.

The compositions of the present invention can also be obtained by preparing separately the said components 1) and 2), by operating with the same catalysts and substantially under the same polymerization conditions as previously explained (except that a wholly sequential polymerization process will not be carried out, but the said components will be prepared in separate polymerization steps) and then mechanically blending said components in the molten or softened state. Conventional mixing apparatuses, like screw extruders, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as flexural modulus, Heat Distortion Temperature (HDT), tensile strength at yield and transparency.

Typical examples of nucleating agents are the Na benzoate, talc and the 1,3- and 2,4-dibenzylidenesorbitols.

The nucleating agents are preferably added to the compositions of the present invention in quantities ranging from 0.01 to 2% by weight, more preferably from 0.05 to 1% by weight with respect to the total weight.

The addition of inorganic fillers, such as talc, calcium carbonate and mineral fibers, also brings about an improvement to some mechanical properties, such as flexural modulus and HDT.

The particulars are given in the following examples, which are given to illustrate, without limiting, the present invention.

EXAMPLE 1

In a plant operating continuously according to the mixed liquid-gas polymerization technique, runs were carried out under the conditions specified in Table 1.

The polymerization was carried out in the presence of a catalyst system in a series of two reactors equipped with devices to transfer the product from one reactor to the one immediately next to it.

Preparation of the Solid Catalyst Component

The Ziegler-Natta catalyst was prepared according to the Example 5, lines 48-55 of the European Patent EP728769. Triethylaluminium (TEAL) was used as co-catalyst and dicyclopentyldimethoxysilane as external donor, with the weight ratios indicated in Table 1.

Catalyst System and Prepolymerization Treatment

The solid catalyst component described above was contacted at 12° C. for 24 minutes with aluminium triethyl (TEAL) and dicyclopentyldimethoxysilane (DCPMS) as outside-electron-donor component. The weight ratio between TEAL and the solid catalyst component and the weight ratio between TEAL and DCPMS are specified in Table 1.

The catalyst system is then subjected to prepolymerization by maintaining it in suspension in liquid propylene at 20° C. for about 5 minutes before introducing it into the first polymerization reactor.

Polymerization

The polymerisation run is conducted in continuous in a series of two reactors equipped with devices to transfer the product from one reactor to the one immediately next to it. The first reactor is a liquid phase reactor, and the second reactor is a fluid bed gas phase reactor.

Polymer component 1) is prepared in the first reactor, while polymer component 2) is prepared in the second reactor.

Temperature and pressure are maintained constant throughout the course of the reaction.

Hydrogen is used as molecular weight regulator.

The gas phase (propylene, ethylene and hydrogen) is continuously analysed via gas-chromatography.

At the end of the run the powder is discharged and dried under a nitrogen flow.

The data relating to Xylenesolubles and comonomer content in the final polymer compositions reported in table 1 and 2 are obtained from measurements carried out on the so obtained polymers, stabilized when necessary.

Then the polymer particles are introduced in an extruder, wherein they are mixed with 1500 ppm of Irganox B 215 (made of 1 part of Irganox 1010 and 2 parts of Irgafos 168) and 500 ppm of Ca stearate. The previously said Irganox 1010 is pentaerytrityl tetrakis 3-(3,5-di-tert-butyl-4-hydroxyphenyl)propanoate, while Irgafos 168 is tris(2,4-di-tert-butylphenyl)phosphite, both marketed by Ciba-Geigy. The polymer particles are extruded under nitrogen atmosphere in a twin screw extruder, at a rotation speed of 250 rpm and a melt temperature of 200-250° C.

The data relating to the physical-mechanical properties of the final polymer compositions reported in table 2 are obtained from measurements carried out on the so extruded polymers.

The data shown in the tables are obtained by using the following test methods.

Molar ratios of the feed gases
Determined by gas-chromatography.
Ethylene and 1-butene content of the polymers
Determined by I.R. spectroscopy
Melt Flow Rate (MFR)
Determined according to ASTM D 1238, condition L (MFR"L" at 230° C., 2.16 Kg).
Xylene soluble and insoluble fractions
Determined as follows.
2.5 g of polymer and 250 ml of Xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 10-15 minutes at 100° C. and in thermostatic water bath at 25° C. for 30 minutes as well. The so formed solid is filtered on quick filtering paper. 100 ml of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in Xylene at room temperature is then calculated.
Intrinsic Viscosity (I.V.)
Determined in tetrahydronaphthalene at 135° C.
Thermal properties (DSC):
The melting temperature (Tm) of the matrix component (1) is measured on the polymer composition before the addition of nucleating agents that can raise the melting temperature peak. Differential scanning calorimetry (DSC) is used according to ISO 11357 with samples of 5-7 mg weight; heating and cooling rates 20° C./min, in a temperature operating range from −5° C. to 200° C.
Flexural Modulus
Determined according to ISO 178.
Izod impact strength (notched)
Determined according to ISO180/1A.
Preparation of the plaque specimens
Plaques for D/B measurement, having dimensions of 127× 127×1.5 mm were prepared as follows.
The injection press was a Negri Bossi™ type (NB 90) with a clamping force of 90 tons. The mould was a rectangular plaque (127×127×1.5 mm)
The main process parameters are reported below:
Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2
Second holding time (s): 7
Cooling time (s): 20
Mould temperature (° C.): 60

The melt temperature was between 220 and 280° C.

Plaques for haze measurement, 1 mm thick, were prepared by injection moulding with injection time of 1 second, temperature of 230° C., mould temperature of 40° C.

The injection press was a Battenfeld™ type BA 500CD with a clamping force of 50 tons. The insert mould led to the moulding of two plaques (55×60×1 mm each).

Ductile/Brittle transition temperature (D/B)

Determined according to the following method. The biaxial impact resistance was determined through impact with an automatic, computerised striking hammer.

The circular test specimens were obtained from plaques, prepared as described above, by cutting with circular hand punch (38 mm diameter). They were conditioned for at least 12 hours at 23° C. and 50 RH and then placed in a thermostatic bath at testing temperature for 1 hour.

The force-time curve was detected during impact of a striking hammer (5.3 kg, hemispheric punch with a 1.27 cm diameter) on the circular specimen resting on a ring support. The machine used was a CEAST 6758/000 type model No. 2.

D/B transition temperature means the temperature at which 50% of the samples undergoes fragile break when submitted to the said impact test.

Haze on plaque

Determined according to the following method. The plaques, prepared as described above, were conditioned for 12 to 48 hours at relative humidity of 50±5% and temperature of 23±1° C.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

The measurement and computation principle are given in the norm ASTM-D1003.

The haze measurement was carried out on five plaques.

Gloss on plaque 10 rectangular specimens (55×60×1 mm) for each polymer to be tested were prepared by injection molding using an injection press Battenfeld BA500CD operated under the following conditions:

Screw speed: 120 rpm
Back pressure: 10 bar
Mould temperature: 40° C.
Melt temperature: 260° C.
Injection time: 3 sec
First holding time: 5 sec
Second holding time: 5 sec
Cooling time (after second holding): 10 sec The value of the injection pressure should be sufficient to completely fill the mould in the above mentioned indicated time span.

By a glossmeter the fraction of luminous flow reflected by the examined specimens surface was measured, under an incident angle of 60°. The value reported in table 2 corresponds to the mean gloss value over 10 specimens for each tested polymer.

The glossmeter used was a photometer Zehntner model ZGM 1020 or 1022 set with an incident angle of 60°. The measurement principle is given in the Norm ASTM D2457.

The apparatus calibration is done with a sample having a known gloss value.

Preparation of the cast film specimens

Films with a thickness of 50 μm were prepared by extruding each polymer composition in a single screw Collin extruder (length/diameter ratio of screw: 30) at a film drawing speed of 7 m/min and a melt temperature of 210-250° C.

Haze on film

Determined on 50 μm thick films of the test composition, prepared as described above. The measurement was carried out on a 50×50 mm portion cut from the central zone of the film.

The instrument used for the test was a Gardner photometer with Haze-meter UX-10 equipped with a G.E. 1209 lamp and filter C. The instrument calibration was made by carrying out a measurement in the absence of the sample (0% Haze) and a measurement with intercepted light beam (100% Haze).

Gloss on film

Determined on the same specimens as for the Haze.

The instrument used for the test was a model 1020 Zehntner photometer for incident measurements. The calibration was made by carrying out a measurement at incidence angle of 60° on black glass having a standard Gloss of 96.2% and a measurement at an incidence angle of 45° on black glass having a standard Gloss of 55.4%.

Fish eyes:

Determined on a 50 μm-thick film specimen prepared as described above. The film is then inspected by means of an optical device (Matrix or Line CCD cameras). Film defects are counted in accordance to their dimension.

COMPARATIVE EXAMPLE 1c

The comparative example (properties reported in table 2) is an heterophasic composition having a random propylene copolymer matrix with an ethylene content of 2.8 wt % and an ethylene-butene elastomeric (rubber) component.

The examples demonstrates that heterophasic compositions not having all the features according to the present invention (particularly MFR, Tm and XStot/XSm) do not provide the valuable balance of properties of the invention.

TABLE 1

| Polymerization Process | | |
|---|---|---|
| EXAMPLE | | 1 |
| TEAL/solid catalyst component | weight ratio | 6 |
| TEAL/DCPMS | molar ratio | 10 |
| liquid phase reactor: propylene homopolymer matrix | | |
| Polymerisation temperature, | ° C. | 70 |
| Pressure, | Mpa | 3.92 |
| Residence time, | min | 72 |
| $H_2$ feed | mol ppm | 4900 |
| MFR "L" | g/10 min | 6.7 |
| Xylene soluble fraction | wt % | 1.5 |
| Split | wt % | 78 |
| gas phase reactor—ethylene-butene-1 copolymer rubber | | |
| Polymerisation temperature, | ° C. | 85 |
| Pressure, | bar | 15 |
| Residence time, | min | 11 |
| $H_2/C_2^-$ | mol ratio | 0.25 |
| $C_4^-/(C_4^- + C_2^-)$ | Mol ratio | 0.45 |
| Split | wt % | 22 |
| Butene-1 in the rubber | wt % | 25 |
| Xylene soluble fraction | wt % | 15.6 |

Notes: $H_2$ feed = calculated with respect to the molar flow of propylene;
$C_2^-$ = ethylene; $C_3^-$ = propylene; $C_4^-$ = butene-1

TABLE 2

| Examples | | 1 | 1c |
|---|---|---|---|
| Matrix properties | | | |
| MFR | g/10 min | 6.7 | 1.5 |
| XSm | % | 1.5 | 4.4 |
| Tm | °C. | 162.5 | 144.9 |
| Comonomer content ($C_2$) | % | 0 | 2.8 |
| Split | wt % | 78 | 80 |
| Composition | | | |
| MFR "L" | g/10 min | 7.2 | 1.8 |
| XStot | wt % | 15.6 | 14.2 |
| XStot/XSm | | 10.3 | 3.2 |
| XSIVtot | dl/g | 1.2 | 1.42 |
| Ethylene content | wt % | 16.5 | 18.3 |
| Butene-1 content | wt % | 5.6 | 4.1 |
| Properties | | | |
| Flexural modulus | MPa | 1150 | 870 |
| Izod impact resistance at 23° C. | $kJ/m^2$ | 7.6 | 58.7 |
| D/B transition temperature | °C. | −28 | −22.7 |
| Haze on plaque (1 mm) | % | 46.3 | 14.3 |
| Gloss on plaque (1 mm) at 60° | % | 91.8 | — |
| Characterization on cast film 50 μ | | | |
| Haze on cast film (50 μm) | % | 3.1 | 9 |
| Gloss on cast film (50 μm) at 45° | % | 79 | — |
| Fish eyes >1.5 mm | (n°/m²) | 0 | 0 |
| Fish eyes 0.7-1.5 mm | (n°/m²) | 3 | 8 |
| Fish eyes 0.5-0 7 mm | (n°/m²) | 6 | 26 |
| Fish eyes > 0.1 mm | (n°/m²) | 196 | 1450 |

The invention claimed is:

1. An article comprising a polyolefin composition comprising, in percent by weight referred to the sum of component 1) and 2):
   (1) 75-85 wt % of a propylene homopolymer or copolymer of propylene with at least one of ethylene and $C_4$-$C_{10}$ α-olefin(s), the homopolymer or copolymer having melting temperature equal to or higher than 150° C., and
   (2) 15-25% of a copolymer of ethylene with at least one $C_4$-$C_{10}$ α-olefin containing from 20 to 30% of said $C_4$-$C_{10}$ α-olefin;
   said composition having
      (i) a value of MFR at 230° C., 2.16 kg of from 5 to 10 g/10 min,
      (ii) a total content of ethylene of from 10 to 20%,
      (iii) a total content of $C_4$-$C_{10}$ α-olefin of from 2 to 8%,
      (iv) a ratio XStot/XSm of the total fraction soluble in xylene at room temperature to the fraction soluble in xylene at room temperature of the component (1) of from 5 to 15, and
      (v) a value XSIVtot of the intrinsic viscosity of the total fraction soluble in xylene at room temperature of 1.5 dl/g.

2. The article of claim 1, wherein the fraction soluble in xylene at room temperature of component (1) is at most 2 wt %.

3. The article of claim 1, wherein component (1) is a copolymer of propylene and the amount of units derived from the at least one ethylene and $C_4$-$C_{10}$ α-olefin is at most 1.5 wt % of the component (1).

4. A process for producing a polyolefin composition comprising:
   polymerizing olefins in at least two sequential polymerization stages with each subsequent polymerization stage being conducted in the presence of the polymeric material formed in the immediately preceding polymerization stage thereby producing the polyolefin composition comprising:
   comprising, in percent by weight referred to the sum of component 1) and 2):
   1) 75-85 wt % of a propylene homopolymer or copolymer of propylene with at least one of ethylene and $C_4$-$C_{10}$ α-olefin(s), the homopolymer or copolymer having melting temperature equal to or higher than 150° C., and
   2) 15-25% of a copolymer of ethylene with at least one $C_4$-$C_{10}$ α-olefin containing from 20 to 30% of said $C_4$-$C_{10}$ α-olefin;
   said composition having
      (i) a value of MFR at 230° C., 2.16 kg of from 5 to 10 g/10 min,
      (ii) a total content of ethylene of from 10 to 20%,
      (iii) a total content of $C_4$-$C_{10}$ α-olefin of from 2 to 8%,
      (iv) a ratio XStot/XSm of the total fraction soluble in xylene at room temperature to the fraction soluble in xylene at room temperature of the component (1) of from 5 to 15, and
      (v) a value XSIVtot of the intrinsic viscosity of the total fraction soluble in xylene at room temperature of 1.5 dl/g.

5. The article of claim 1 wherein the article is a film.

6. The article of claim 5 wherein the film is a cast film.

7. The article of claim 1 wherein the article is an injection molded article.

* * * * *